US012126217B2

(12) United States Patent
Hirayama et al.

(10) Patent No.: US 12,126,217 B2
(45) Date of Patent: Oct. 22, 2024

(54) CORE BLOCK, LAMINATED CORE, AND ELECTRIC MOTOR

(71) Applicant: NIPPON STEEL CORPORATION, Tokyo (JP)

(72) Inventors: Ryu Hirayama, Tokyo (JP); Kazutoshi Takeda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 415 days.

(21) Appl. No.: 17/606,036

(22) PCT Filed: Jun. 22, 2020

(86) PCT No.: PCT/JP2020/024389
§ 371 (c)(1),
(2) Date: Oct. 24, 2021

(87) PCT Pub. No.: WO2020/262298
PCT Pub. Date: Dec. 30, 2020

(65) Prior Publication Data
US 2022/0209592 A1  Jun. 30, 2022

(30) Foreign Application Priority Data
Jun. 26, 2019  (JP) .................................. 2019-118337

(51) Int. Cl.
*H02K 1/18* (2006.01)
*H01F 3/02* (2006.01)
(Continued)

(52) U.S. Cl.
CPC .............. *H02K 1/185* (2013.01); *H01F 3/02* (2013.01); *H01F 27/245* (2013.01); *H01F 27/263* (2013.01)

(58) Field of Classification Search
CPC ...... H02K 1/185; H01F 27/245; H01F 27/263
See application file for complete search history.

(56) References Cited

U.S. PATENT DOCUMENTS

2009/0195110 A1  8/2009  Miyake
2011/0180216 A1*  7/2011  Miyake .................... H02K 1/08
156/510
(Continued)

FOREIGN PATENT DOCUMENTS

EP           214305 A  *  3/1987  ......... B32B 37/1292
JP      2002-078257 A     3/2002
(Continued)

OTHER PUBLICATIONS

JP-2013089883-A_translate (Year: 2013).*
JP-2011066987-A_translate (Year: 2011).*
JP-2014096429-A_translate (Year: 2014).*

*Primary Examiner* — Tulsidas C Patel
*Assistant Examiner* — Mohammed Ahmed Qureshi
(74) *Attorney, Agent, or Firm* — Renner, Otto, Boisselle & Sklar, LLP

(57) ABSTRACT

What is disclosed is a core block, a plurality thereof constituting a laminated core by being connected in an annular shape, the core block including: a plurality of electrical steel sheet pieces stacked to each other; and an adhesion part which is provided between the electrical steel sheet pieces adjacent in a stacking direction and adheres the electrical steel sheet pieces to each other, in which an adhesion area ratio of the electrical steel sheet piece by the adhesion part is 1% or more and 60% or less.

18 Claims, 12 Drawing Sheets

(51) Int. Cl.
*H01F 27/245* (2006.01)
*H01F 27/26* (2006.01)

(56) References Cited

U.S. PATENT DOCUMENTS

2012/0052234 A1*  3/2012  Natarajan ............. B29C 33/424
                                                          73/105
2017/0117758 A1   4/2017  Nakagawa

FOREIGN PATENT DOCUMENTS

| | | | |
|---|---|---|---|
| JP | 2002332320 A | | 11/2002 |
| JP | 2003-026708 A | | 1/2003 |
| JP | 2007015302 A | | 1/2007 |
| JP | 2008067459 A | | 3/2008 |
| JP | 2009-072014 A | | 4/2009 |
| JP | 2009-177895 A | | 8/2009 |
| JP | 2011-023523 A | | 2/2011 |
| JP | 2011066987 A | * | 3/2011 |
| JP | 2012-029494 A | | 2/2012 |
| JP | 2013089883 A | * | 5/2013 |
| JP | 2014096429 A | * | 5/2014 |
| JP | 2017-011863 A | | 1/2017 |
| KR | 10-2017-0021861 A | | 2/2017 |

* cited by examiner

CORE BLOCK, LAMINATED CORE, AND ELECTRIC MOTOR

TECHNICAL FIELD

The present invention relates to a core block, a laminated core, and an electric motor.

Priority is claimed on Japanese Patent Application No. 2019-118337, filed Jun. 26, 2019, the content of which is incorporated herein by reference.

BACKGROUND ART

In the related art, a laminated core as described in Patent Document 1 below is known. In this laminated core, electrical steel sheets adjacent in a stacking direction are adhered to each other.

CITATION LIST

Patent Document

[Patent Document 1]
Japanese Unexamined Patent Application, First Publication No. 2011-023523

SUMMARY OF THE INVENTION

Problems to be Solved by the Invention

There is room for improvement in the magnetic properties of the laminated core of the related art.

The present invention has been made in view of the above circumstances, and an object of the present invention is to improve the magnetic properties of the laminated core.

Means for Solving the Problem

To solve the above problems, the present invention proposes the following means.
(1) A first aspect of the present invention is a core block, a plurality thereof constituting a laminated core by being connected in an annular shape, the core block including: a plurality of electrical steel sheet pieces stacked to each other; and an adhesion part which is provided between the electrical steel sheet pieces adjacent in a stacking direction and adheres the electrical steel sheet pieces to each other, in which an adhesion area ratio of each of the electrical steel sheet pieces by the adhesion part is 1% or more and 60% or less.

If the electrical steel sheet pieces adjacent in the stacking direction are not fixed to each other by some means, relative displacement occurs. On the other hand, in a case in which the electrical steel sheet pieces adjacent in the stacking direction are fixed to each other, for example, by the fastening, plastic strain is applied to a part of each of the electrical steel sheet pieces, and the magnetic properties of the core block deteriorate.

In the core block having the above-described configuration, the electrical steel sheet pieces adjacent in the stacking direction are adhered to each other by the adhesion part. Therefore, it is possible to suppress the relative displacement between the electrical steel sheet pieces adjacent in the stacking direction in all of the plurality of electrical steel sheet pieces. Since the adhesion area ratio of the adhesion part provided in each of the electrical steel sheet pieces is 1% or more, the adhesion between the electrical steel sheet pieces by the adhesion part is ensured, and the relative displacement between the electrical steel sheet pieces adjacent in the stacking direction can be effectively regulated even during winding. Moreover, since the method of fixing the electrical steel sheet pieces to each other is not the fixing by the fastening as described above but the fixing by adhesion, the strain generated in each of the electrical steel sheet pieces can be suppressed. In this way, the magnetic properties of the core block can be ensured.

Additionally, compressive stress is generated in each of the electrical steel sheet pieces as the adhesion part cures. Therefore, the strain may also be generated in each of the electrical steel sheet pieces due to the adhesion by the adhesion part. In the core block having the above configuration, the adhesion area ratio of each of the electrical steel sheet pieces by the adhesion part is 60% or less. Therefore, the strain generated in each of the electrical steel sheet pieces due to the adhesion part can be suppressed to a low level. Therefore, the magnetic properties of the core block can be further ensured.

(2) In the core block according to (1), the adhesion area ratio may be 1% or more and 20% or less.

According to this configuration, the strain generated in each of the electrical steel sheet pieces due to the adhesion part can be further suppressed to a low level.

(3) The core block according to (1) or (2) may include: an arc-shaped stator yoke part; and a tooth part that protrudes from the stator yoke part to one side in a radial direction of the stator yoke part, in which the adhesion part may include a pair of first portions that extend along peripheral edges on both sides of the tooth part in a circumferential direction, a second portion that extends along a peripheral edge of a tip end of the tooth part and connects tip ends of the pair of first portions to each other, a pair of third portions that extend from base ends of the first portions to both sides in the circumferential direction along a peripheral edge on the one side in the radial direction of the stator yoke part, a fourth portion 45b that extends in the circumferential direction along a peripheral edge on another side of the stator yoke part in the radial direction, and a pair of fifth portions that extend along peripheral edges on both sides of the stator yoke part in the circumferential direction and connect the third portions and the fourth portion to each other.

(4) In the core block according to (3), a width of each of the second portion and the fifth portion may be narrower than a width of the fourth portion.

(5) In the core block according to any one of (1) to (4), the adhesion part may be provided on at least a part of a peripheral edge of each of the electrical steel sheet pieces.

By disposing the adhesion part on the peripheral edge of each of the electrical steel sheet pieces, for example, it is possible to suppress the turning over of each of the electrical steel sheet pieces. This facilitates a winding process, and it is possible to further ensure the magnetic properties of the laminated core.

(6) In the core block according to any one of (1) to (4), a non-adhesion region of each of the electrical steel sheet pieces in which the adhesion part is not provided may be formed between an adhesion region of each of the electrical steel sheet pieces in which the adhesion part is provided and a peripheral edge of each of the electrical steel sheet pieces.

The electrical steel sheet pieces for forming the core block are manufactured by a process of punching electrical steel sheet pieces as a base material. At the time of the process of punching, strain due to the process of punching is applied to a width having the magnitude corresponding to the sheet thickness of each of the electrical steel sheet pieces from the peripheral edge of each of the electrical steel sheet pieces toward the inside of each of the electrical steel sheet pieces. Since the peripheral edge of each of the electrical steel sheet pieces is work-hardened by the above strain, the peripheral edge of each of the electrical steel sheet pieces is unlikely to deform so as to locally turn over. Therefore, the electrical steel sheet pieces are unlikely to be deformed even if the peripheral edges of the electrical steel sheet pieces are not adhered to each other. Therefore, even when the non-adhesion region is formed on the peripheral edge of each of the electrical steel sheet pieces, the deformation of the electrical steel sheet pieces can be suppressed. By forming the non-adhesion region in this way, it is possible to suppress the application of extra strain to each of the electrical steel sheet pieces. Therefore, the magnetic properties of the core block can be further ensured.

(7) In the core block according to (6), a width of the non-adhesion region may be 1 times or more and 10 times or less a sheet thickness of each of the electrical steel sheet pieces.

(8) The core block according to (1) or (2) may include: an arc-shaped stator yoke part; and a tooth part that protrudes from the stator yoke part in a radial direction of the stator yoke part, in which a non-adhesion region of each of the electrical steel sheet pieces in which the adhesion part is not provided may be formed at a tip end of the tooth part and both ends of the stator yoke part in a circumferential direction in each of the electrical steel sheet pieces.

In the core block, magnetic flux diffuses and extends from the tip end of the tooth part to both sides in the circumferential direction. Therefore, the magnetic flux tends to concentrate on the tip end of the tooth part. Further, the magnetic flux penetrates into the adjacent core blocks from both ends of the stator yoke part in the circumferential direction. Therefore, the magnetic flux tends to concentrate on both ends of the stator yoke part in the circumferential direction. When the adhesion region is provided in the region on which the magnetic flux concentrates, the increase in iron loss tends to be remarkable. Therefore, if the adhesion region is provided at the tip end of the tooth part and both ends of the stator yoke part in the circumferential direction, the iron loss tends to increase. According to the above configuration, since the non-adhesion region in which the adhesion part is not provided is located at the tip end of the tooth part and both ends of the stator yoke part in the circumferential direction, the adhesion region can be disposed to be separated from the region having a high magnetic flux density and the increase in iron loss can be suppressed.

(9) The core block according to (1) or (2) may include: an arc-shaped stator yoke part; and a tooth part that protrudes from the stator yoke part in a radial direction of the stator yoke part, in which an adhesion area of the stator yoke part by the adhesion part may be equal to or larger than the adhesion area of the tooth part by the adhesion part.

In a case in which the width (the magnitude in the circumferential direction) of the tooth part is narrower than the width (the magnitude in the radial direction) of the stator yoke part, the magnetic flux tends to concentrate on the tooth part and the magnetic flux density of the tooth part tends to be high. Therefore, when strain is applied to the electrical steel sheet by the adhesion part, if the amount of the strain is the same, the influence on the magnetic properties of the tooth part is greater than that on the magnetic properties of the stator yoke part.

The adhesion area of the stator yoke part by the adhesion part is equal to or larger than the adhesion area of the tooth part by the adhesion part. Therefore, it is possible to ensure the adhesion strength of the laminated core as a whole in the stator yoke part while suppressing the influence of deterioration of the magnetic properties due to the strain of the adhesion part in the tooth part.

(10) In the laminated core according to any one of (1) to (9), an average thickness of the adhesion part may be 1.0 μm to 3.0 μm.

(11) In the laminated core according to any one of (1) to (10), an average tensile modulus of elasticity E of the adhesion part may be 1500 MPa to 4500 MPa.

(12) In the laminated core according to any one of (1) to (11), the adhesion part may be a room temperature adhesion type acrylic-based adhesive including SGA made of an elastomer-containing acrylic-based adhesive.

(13) A second aspect of the present invention is a laminated core constituted by a plurality of core blocks, each of which is the core block according to any one of (1) to (12), connected to each other in an annular shape.

(14) A second aspect of the present invention is an electric motor including the laminated core according to (13).

Effects of the Invention

According to the present invention, it is possible to improve the magnetic properties of the laminated core.

EMBODIMENT(S) FOR IMPLEMENTING THE INVENTION

Hereinafter, an electric motor according to an embodiment of the present invention will be described with reference to the drawings. In the present embodiment, a motor, specifically, an AC motor, more specifically, a synchronous motor, and even more specifically, a permanent magnetic electric motor, will be described as an example of the electric motor. This type of motor is suitably employed for, for example, an electric vehicle and the like.

Figure 1:
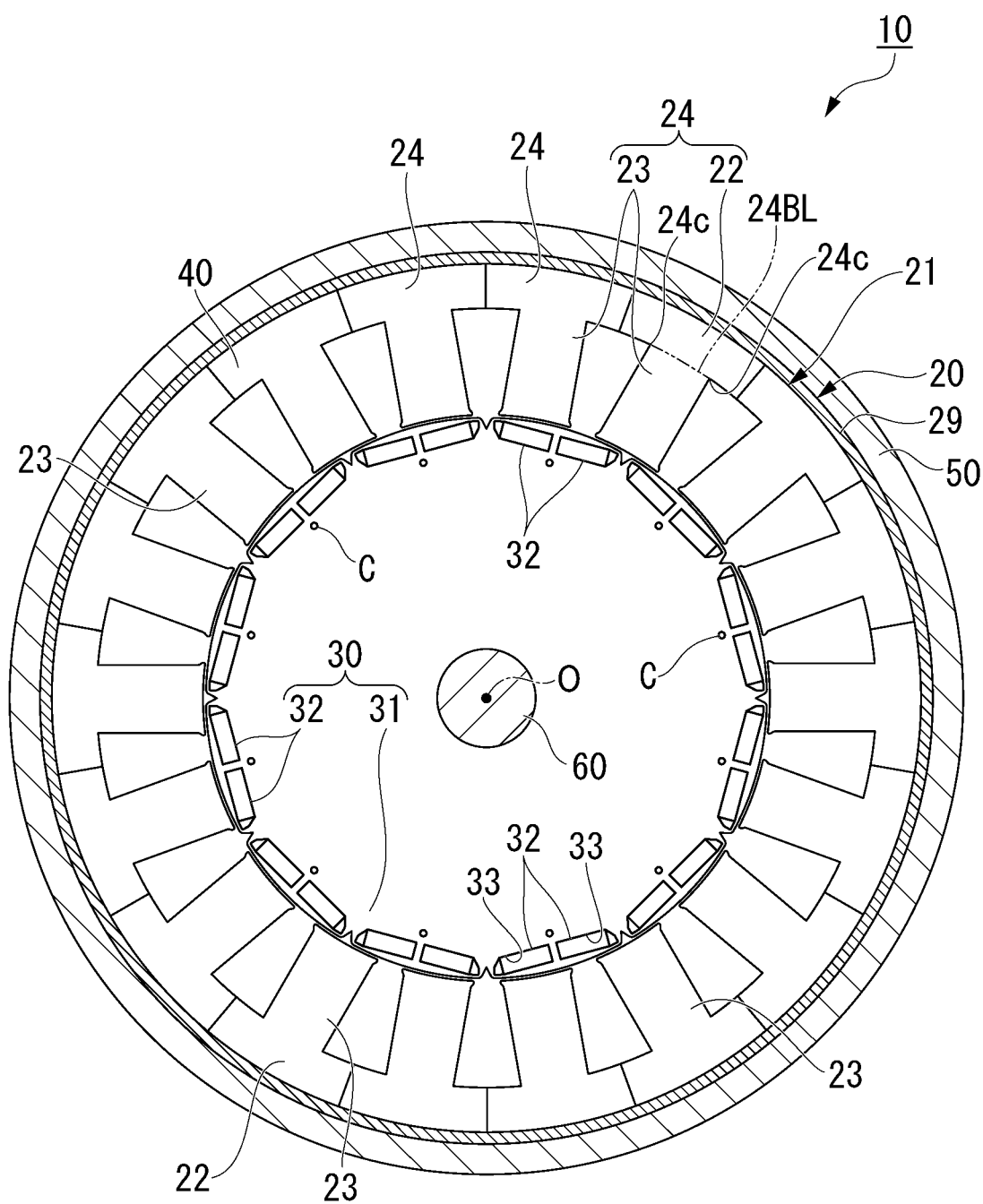
FIG. 1 is a plan view of an electric motor according to an embodiment of the present invention.

As shown in FIG. 1, an electric motor 10 includes a stator 20, a rotor 30, a case 50, and a rotary shaft 60. The stator 20 and the rotor 30 are housed in the case 50. The stator 20 is fixed to the case 50.

In the present embodiment, as the electric motor 10, an inner rotor type electric motor in which the rotor 30 is located inside the stator 20 is employed. However, as the electric motor 10, an outer rotor type electric motor in which the rotor 30 is located outside the stator 20 may be employed. Further, in the present embodiment, the electric motor 10 is a three-phase AC motor with twelve poles and eighteen slots. However, for example, the number of poles, the number of slots, the number of phases, and the like can be appropriately changed. For example, when an excitation current having an effective value of 10 A and a frequency of 100 Hz is applied to each phase, the electric motor 10 can rotate at a rotation speed of 1000 rpm.

The stator 20 includes a stator core (a laminated core) 21, a fastening ring 29, and a winding (not shown). Hereinafter, a direction along the central axis O of the stator core 21 is simply referred to as an axial direction, a direction which passes through the central axis O of the stator core 21 and is orthogonal to the central axis O is simply referred to as a radial direction, and a direction of rotation around the central axis O of the stator core 21 is simply referred to as a circumferential direction. Further, in the present specification, "an inside in the radial direction" may be referred to as "one side in the radial direction".

The rotor 30 is disposed inside the stator 20 (the stator core 21) in the radial direction. The rotor 30 includes a rotor core 31 and a plurality of permanent magnets 32.

The rotor core 31 is disposed coaxially with the stator 20 to form an annular shape (a circular shape). The rotary shaft 60 is disposed in the rotor core 31. The rotary shaft 60 is fixed to the rotor core 31.

The plurality of permanent magnets 32 are fixed to the rotor core 31. In the present embodiment, a set of two permanent magnets 32 form one magnetic pole. A plurality of sets of the permanent magnets 32 are disposed at equal intervals in the circumferential direction. In the present embodiment, twelve sets (twenty four in total) of the permanent magnets 32 are provided every 30 degrees around the central axis O.

In the present embodiment, as the permanent magnetic electric motor, an interior permanent magnet motor is employed. In the rotor core 31, a plurality of through holes 33 that penetrate the rotor core 31 in the axial direction are formed. The plurality of through holes 33 are provided to correspond to the plurality of permanent magnets 32. Each permanent magnet 32 is fixed to the rotor core 31 while disposed in the corresponding through hole 33. For example, an outer surface of the permanent magnet 32 and an inner surface of the through hole 33 are adhered to each other with an adhesive, and thus the fixing of each permanent magnet 32 to the rotor core 31 can be realized. As the permanent magnetic electric motor, a surface permanent magnet motor may be employed instead of the interior permanent magnet motor.

The rotor core 31 is a laminated core. That is, the rotor core 31 is formed by a plurality of electrical steel sheets being stacked. The stacking thickness of the rotor core 31 is, for example, 50.0 mm. The outer diameter of the rotor core 31 is, for example, 163.0 mm. The inner diameter of the rotor core 31 is, for example, 30.0 mm.

In the present embodiment, the plurality of electrical steel sheets for forming the rotor core 31 are fixed to each other by a fastening part C (a dowel). However, the plurality of electrical steel sheets for forming the rotor core 31 may be adhered to each other.

Next, the stator core 21 will be described more specifically.

The stacking thickness of the stator core 21 is, for example, 50.0 mm. The outer diameter of the stator core 21 is, for example, 250.0 mm. The inner diameter of the stator core 21 is, for example, 165.0 mm. Here, the inner diameter of the stator core 21 is based on a tip end of each of tooth parts 23 of the stator core 21. The inner diameter of the stator core 21 is a diameter of a virtual circle inscribed in the tip ends of all of the tooth parts 23.

The stator core 21 is a split core. Therefore, the stator core 21 has a plurality of core blocks 24. The plurality of core blocks 24 constitute the stator core 21 by being connected to each other in an annular shape. The fastening ring 29 is disposed outside the plurality of core blocks 24 in the radial direction. The plurality of core blocks 24 are fixed to each other by being fitted into the fastening ring 29.

Next, the core blocks 24 will be described.

Each of the core blocks 24 has an arc-shaped stator yoke part 22 extending in the circumferential direction and a tooth part 23. FIG. 1 shows a boundary line 24BL between the stator yoke part 22 and the tooth part 23. The core block 24 has a pair of corner parts 24c provided between a surface facing the inside in the radial direction and a surface facing in the circumferential direction among outside surfaces thereof. The boundary line 24BL is an arc which is centered on the central axis O and passes through the pair of corner parts 24c.

The stator yoke part 22 is formed in an arc shape centered on the central axis O in a plan view of the stator 20 in the axial direction.

The tooth part 23 protrudes inward from the stator yoke part 22 in the radial direction (toward the central axis O of the stator yoke part 22 in the radial direction). The plurality of core blocks 24 are arranged in an annular shape in the circumferential direction to constitute the stator core 21, and thus the plurality of tooth parts 23 are disposed at equal intervals in the circumferential direction. In the stator 20 of the present embodiment, eighteen tooth parts 23 are provided every 20 degrees around the central axis O. The plurality of tooth parts 23 are formed to have the same shape and the same size.

The winding is wound around the tooth parts 23. The winding may be a concentrated winding or a distributed winding.

The core block 24 is constituted by a plurality of electrical steel sheet pieces 40 being stacked in the axial direction, and the electrical steel sheet pieces 40 are formed by an electrical steel sheet being punched. That is, the core block 24 has a plurality of electrical steel sheet pieces 40 stacked on each other. Therefore, the stator core 21 is a laminated core. Each of the plurality of electrical steel sheet pieces 40 has a T-shape in the axial direction.

Each electrical steel sheet piece 40 for forming the core block 24 is formed, for example, by a process of punching an electrical steel sheet as a base material. A known electrical steel sheet can be used as the electrical steel sheet pieces 40. The chemical composition of the electrical steel sheet pieces 40 is not particularly limited. In the present embodiment, as the electrical steel sheet pieces 40, a non-grain-oriented electrical steel sheet is employed. As the non-grain-oriented electrical steel sheet, for example, a non-grain-oriented electrical steel strip of JIS C 2552: 2014 can be employed. However, as the electrical steel sheet pieces 40, a grain-oriented electrical steel sheet can also be employed instead of a non-grain-oriented electrical steel sheet. As the grain-oriented electrical steel sheet, for example, a grain-oriented electrical steel strip of JIS C 2553: 2012 can be employed.

An insulation coating is provided on both surfaces of each of the electrical steel sheet pieces 40 to improve the workability of the electrical steel sheet pieces 40 and to reduce the iron loss of the core block 24. As the substance constituting the insulation coating, for example, (1) an inorganic compound, (2) an organic resin, (3) a mixture of an inorganic compound and an organic resin, and the like can be applied. Examples of the inorganic compound include (1) a complex of dichromate and boric acid, (2) a complex of phosphate and silica, and the like. Examples of the organic resin include epoxy-based resins, acrylic-based resins, acrylic-styrene-based resins, polyester-based resins, silicone-based resins, fluorine-based resins, and the like.

To ensure the insulation performance between the electrical steel sheet pieces 40 stacked on each other, the thickness of the insulation coating (the thickness per one surface of each of the electrical steel sheet pieces 40) is preferably 0.1 μm or more.

On the other hand, as the insulation coating becomes thicker, the insulation effect becomes saturated. Further, as the insulation coating becomes thicker, the proportion of the insulation coating in the core block 24 increases, the magnetic characteristics of the core block 24 deteriorate, and performance of the laminated core deteriorates. Therefore, it is preferable to form the insulation coating as thin as possible in a range in which the insulation performance can be ensured. The thickness of the insulation coating (the thickness per one surface of each of the electrical steel sheet pieces 40) is preferably 0.1 μm or more and 5 μm or less, and more preferably 0.1 μm or more and 2 μm or less.

As the electrical steel sheet pieces 40 become thinner, the effect of reducing the iron loss gradually becomes saturated. Further, as the electrical steel sheet pieces 40 become thinner, the manufacturing cost of the electrical steel sheet pieces 40 increases. Therefore, in consideration of the effect of reducing the iron loss and the manufacturing cost, the thickness of each of the electrical steel sheet pieces 40 is preferably 0.10 mm or more.

On the other hand, if the electrical steel sheet pieces 40 are too thick, a press punching operation of the electrical steel sheet pieces 40 becomes difficult. Therefore, in consideration of the press punching operation of the electrical steel sheet pieces 40, the thickness of each of the electrical steel sheet pieces 40 is preferably 0.65 mm or less.

Further, as the electrical steel sheet pieces 40 become thicker, the iron loss increases. Therefore, in consideration of the iron loss characteristics of the electrical steel sheet pieces 40, the thickness of each of the electrical steel sheet pieces 40 is preferably 0.35 mm or less, and more preferably 0.20 mm or 0.25 mm.

In consideration of the above points, the thickness of each electrical steel sheet piece 40 is, for example, 0.10 mm or more and 0.65 mm or less, preferably 0.10 mm or more and 0.35 mm or less, and more preferably 0.20 mm or 0.25 mm. The thickness of each of the electrical steel sheet pieces 40 also includes the thickness of the insulation coating.

The plurality of electrical steel sheet pieces 40 for forming the core block 24 are adhered to each other by an adhesion part 41. The adhesion part 41 is an adhesive that is provided between the electrical steel sheet pieces 40 adjacent in the stacking direction and has cured without being divided. As the adhesive, for example, a thermosetting type adhesive using polymer bonding or the like is used. As a composition of the adhesive, (1) an acrylic-based resin, (2) an epoxy-based resin, (3) a composition containing an acrylic-based resin and an epoxy-based resin, and the like can be applied. As such an adhesive, in addition to the thermosetting type adhesive, a radical polymerization type adhesive and the like can also be used, and from the viewpoint of productivity, it is desirable to use a room temperature curing type adhesive. The room temperature curing type adhesive cures at 20° C. to 30° C. As the room temperature curing type adhesive, an acrylic-based adhesive is preferable. Typical acrylic-based adhesives include a second generation acrylic-based adhesive (SGA) and the like. Any one of an anaerobic adhesive, an instant adhesive, and an elastomer-containing acrylic-based adhesive can be used as long as the effects of the present invention are not impaired. The adhesive referred to here is an adhesive in a state before curing, and after the adhesive cures, it becomes the adhesion part 41.

An average tensile modulus of elasticity E of the adhesion parts 41 at room temperature (20° C. to 30° C.) is in the range of 1500 MPa to 4500 MPa. If the average tensile modulus of elasticity E of the adhesion parts 41 is less than 1500 MPa, a problem that the rigidity of the laminated core is lowered occurs. Therefore, the lower limit value of the average tensile modulus of elasticity E of the adhesion parts 41 is 1500 MPa, and more preferably 1800 MPa. On the other hand, if the average tensile modulus of elasticity E of the adhesion parts 41 exceeds 4500 MPa, a problem that the insulation coating formed on a surfaces of each of the electrical steel sheet pieces 40 is peeled off occurs. Therefore, the upper limit value of the average tensile modulus of elasticity E of the adhesion parts 41 is 4500 MPa, and more preferably 3650 MPa.

The average tensile modulus of elasticity E is measured by a resonance method. Specifically, a tensile modulus of elasticity is measured in conformity with JIS R 1602: 1995.

More specifically, first, a sample for measurement (not shown) is made. This sample is obtained by adhering two electrical steel sheet pieces 40 to each other with the adhesive to be measured and curing the adhesive to form the adhesion part 41. In a case in which the adhesive is a thermosetting type adhesive, this curing is performed by heating and pressurizing under heating and pressurizing conditions in actual operation. On the other hand, in a case in which the adhesive is a room temperature curing type adhesive, the curing is performed by pressurizing at room temperature.

Then, the tensile modulus of elasticity of this sample is measured by a resonance method. As described above, a method of measuring a tensile modulus of elasticity by the resonance method is performed in conformity with JIS R 1602: 1995. After that, the tensile modulus of elasticity of the adhesion part 41 alone is obtained by removing the influence of the electrical steel sheet pieces 40 from the tensile modulus of elasticity (the measured value) of the sample by calculation.

The tensile modulus of elasticity thus obtained from the sample is equal to an average value for the laminated core as a whole, and thus this value is regarded as the average tensile modulus of elasticity E. The composition is set such that the average tensile modulus of elasticity E hardly changes irrespective of a stacking position in the stacking direction and a circumferential position around the central axis of the laminated core. Therefore, a value obtained by measuring the tensile modulus of elasticity of the cured adhesion part 41 at an upper end position in the laminated core can be regarded as the average tensile modulus of elasticity E.

As an adhesion method, a method of applying an adhesive to the electrical steel sheet pieces 40, and then adhering the electrical steel sheet pieces 40 to each other by either one or both of heating and pressure-stacking can be employed. A heating means may be, for example, any means such as a method of heating in a high temperature bath or an electric furnace, a method of directly energizing, or the like.

To obtain stable and sufficient adhesion strength, the thickness of the adhesion part 41 is preferably 1 μm or more.

On the other hand, when the thickness of the adhesion part 41 exceeds 100 μm, an adhesion force becomes saturated. Further, as the adhesion part 41 becomes thicker, the proportion of the adhesion part in the core block 24 increases, and the magnetic properties of the core block 24 in the iron loss and the like deteriorates. Therefore, the thickness of the adhesion part 41 is preferably 1 μm or more and 100 μm or less, and more preferably 1 μm or more and 10 μm or less.

In the above, the thickness of the adhesion part 41 means the average thickness of the adhesion parts 41.

The average thickness of the adhesion parts 41 is more preferably 1.0 μm or more and 3.0 μm or less. If the average thickness of the adhesion parts 41 is less than 1.0 μm, a sufficient adhesion force cannot be secured as described above. Therefore, the lower limit value of the average thickness of the adhesion parts 41 is 1.0 μm, and more preferably 1.2 μm. On the contrary, if the average thickness of the adhesion parts 41 becomes thicker than 3.0 μm, problems such as a large increase in a strain amount of the electrical steel sheet piece 40 due to shrinkage during thermosetting occur. Therefore, the upper limit value of the average thickness of the adhesion parts 41 is 3.0 μm, and more preferably 2.6 μm.

The average thickness of the adhesion parts 41 is the average value for the laminated core as a whole. The average thickness of the adhesion parts 41 hardly changes irrespective of a stacking position in the stacking direction and a circumferential position around the central axis of the laminated core. Therefore, an average value of values obtained by measuring the thicknesses of the adhesion parts 41 at the upper end position in the laminated core at ten or more points in the circumferential direction can be regarded as the average thickness of the adhesion parts 41.

The average thickness of the adhesion parts 41 can be adjusted, for example, by changing the application amount of the adhesive. Further, for example, in a case of a thermosetting type adhesive, the average tensile modulus of elasticity E of the adhesion parts 41 can be adjusted by changing either one or both of heating and pressurizing conditions applied at the time of adhesion and the type of a curing agent.

Figure 2:
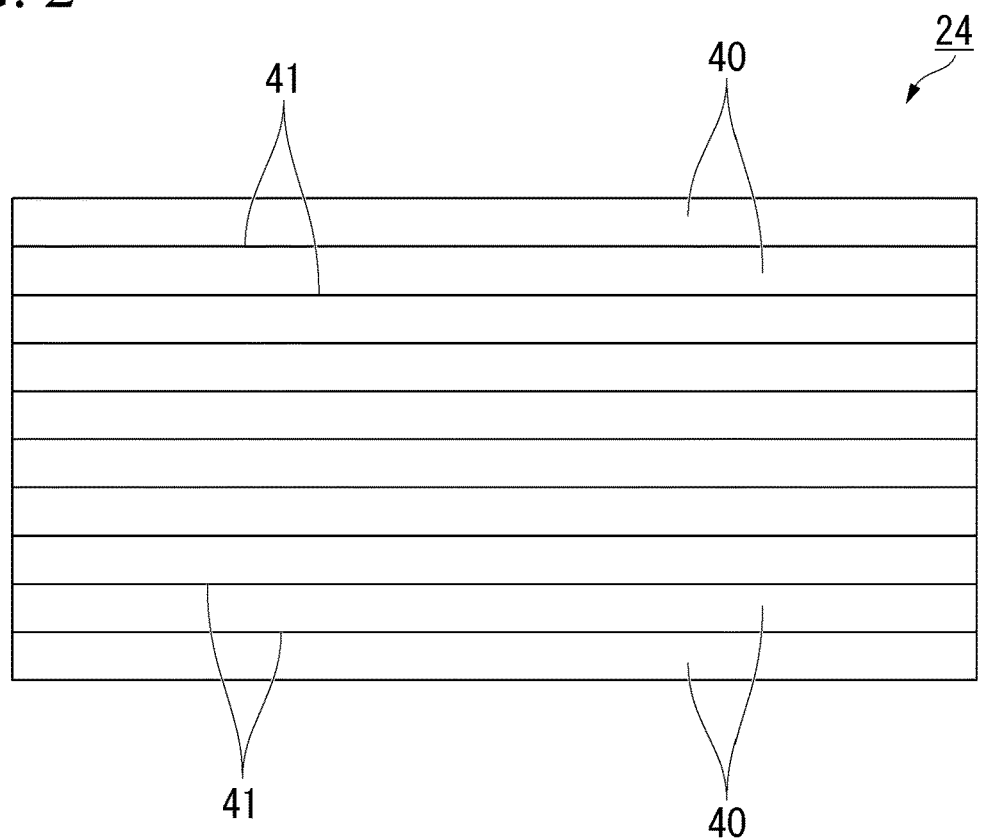
FIG. 2 is a side view of a core block included in the electric motor shown in FIG. 1.

As shown in FIG. 2, in the present embodiment, the electrical steel sheet pieces 40 adjacent in the stacking direction are adhered to each other by the adhesion part 41. In the illustrated example, the electrical steel sheet pieces 40 adjacent in the stacking direction are fixed to each other by only adhesion and are not fixed to each other by other means (for example, fastening or the like).

Figure 3:
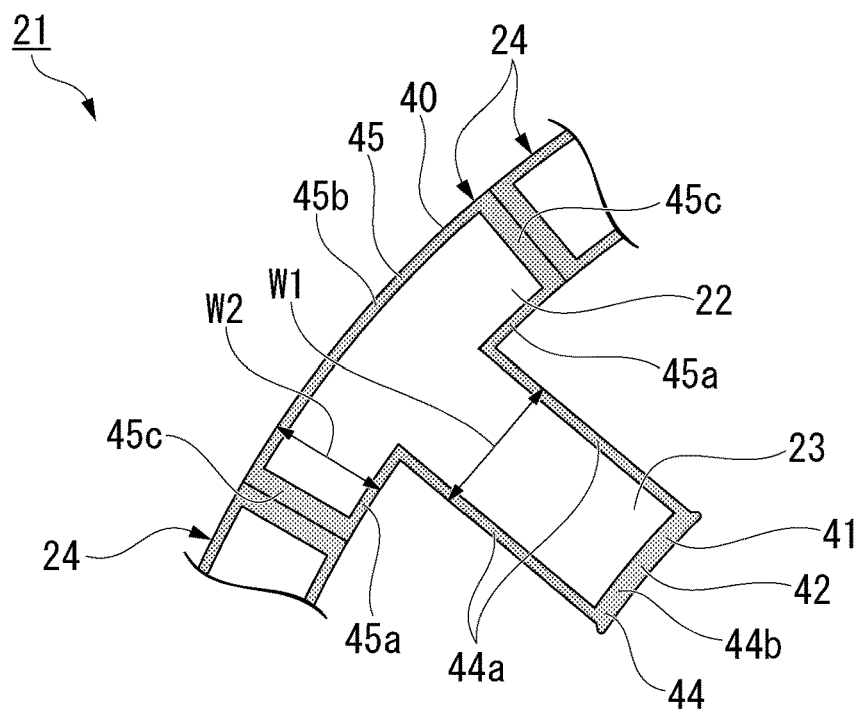
FIG. 3 is a plan view of the core block included in the electric motor shown in FIG. 1.

In FIG. 3, the adhesion part 41 is emphasized with a dot pattern. As shown in FIG. 3, the electrical steel sheet pieces 40 adjacent in the stacking direction are not in whole surface adhesion state. These electrical steel sheet pieces 40 are locally adhered to each other.

In the present embodiment, the electrical steel sheet pieces 40 adjacent in the stacking direction are adhered to each other by the adhesion part 41 provided in a peripheral edge of the electrical steel sheet piece 40. According to the present embodiment, the adhesion part 41 is provided over the entire peripheral edge of the electrical steel sheet piece 40. However, the adhesion part 41 only has to be provided on at least a part of the peripheral edge of the electrical steel sheet piece 40.

The adhesion part 41 is formed in a band shape in a plan view. Here, the band shape also includes a shape in which the width of the band changes in the middle. For example, a shape in which round points are continuous in one direction without being divided is also included in the band shape extending in one direction. Further, the term "it is along the peripheral edge of the electrical steel sheet piece 40" includes not only a case in which it is completely parallel to the peripheral edge but also a case in which it has an inclination of, for example, within 5 degrees with respect to the peripheral edge.

The adhesion part 41 has a tooth portion 44 disposed in the tooth part 23 and a stator yoke portion 45 disposed in the stator yoke part 22. The tooth portion 44 of the adhesion part 41 has a pair of first portions 44a and a second portion 44b. The stator yoke portion 45 of the adhesion part 41 has a pair of third portions 45a, a fourth portion 45b, and a pair of fifth portions 45c. That is, the adhesion part 41 has a pair of first portions 44a, a second portion 44b, a pair of third portions 45a, a fourth portion 45b, and a pair of fifth portions 45c.

The pair of first portions 44a extend along peripheral edges on both sides of the tooth part 23 in the circumferential direction. The pair of first portions 44a are disposed at intervals in the circumferential direction. The second portion 44b extends along a peripheral edge of a tip end of the tooth part 23 and connects tip ends of the pair of first portions 44a to each other. The pair of third portions extend from base ends of the first portions 44a to both sides in the circumferential direction along a peripheral edge on an inside of the stator yoke part 22 in the radial direction (one side in the radial direction). The fourth portion 45b extends in the circumferential direction along a peripheral edge on an outside of the stator yoke part 22 in the radial direction (another side in the radial direction). The pair of fifth portions 45c extend along peripheral edges on both sides of the stator yoke part 22 in the circumferential direction and connect the third portions 45a and the fourth portion 45b to each other.

According to the present embodiment, the first portions 44a, the second portion 44b, the third portions 45a, the fourth portion 45b, and the fifth portions 45c of the adhesion part 41 are formed to cover the peripheral edges that constitute an outer shape of the electrical steel sheet piece 40. Therefore, the stacked electrical steel sheet pieces 40 can be firmly held together in the vicinity of the peripheral edge of the adhesion part 41. As a result, it is possible to effectively suppress the turning over which tends to occur from the vicinity of the peripheral edge of the electrical steel sheet pieces 40, and it is possible to realize firm fixing between the electrical steel sheet pieces 40 while lowering the adhesion area ratio.

In the present embodiment, in a plan view of the electrical steel sheet piece 40, the adhesion part 41 is provided without a gap from the peripheral edge of the electrical steel sheet piece 40, but the present invention is not limited to this. For example, as in a core block 124 according to Modification Example 1 shown in FIG. 4, in the plan view of the electrical steel sheet piece 40, an adhesion part 141 may be provided with a gap with respect to the peripheral edge of the electrical steel sheet piece 40. That is, a non-adhesion region 143 of the electrical steel sheet piece 40 in which the adhesion part 141 is not provided may be formed between an adhesion region 142 of the electrical steel sheet piece 40 in which the adhesion part 141 is provided and the peripheral edge of the electrical steel sheet piece 40. The adhesion region 142 of the electrical steel sheet piece 40 in which the adhesion part 141 is provided means a region of a surface of the electrical steel sheet piece 40 facing in the stacking direction (hereinafter referred to as a first surface of the electrical steel sheet piece 40) in which the adhesive that has cured without being divided is provided. The non-adhesion region 143 of the electrical steel sheet piece 40 in which the adhesion part 141 is not provided means a region of the first surface of the electrical steel sheet piece 40 in which the adhesive that has cured without being divided is not provided.

Figure 5:
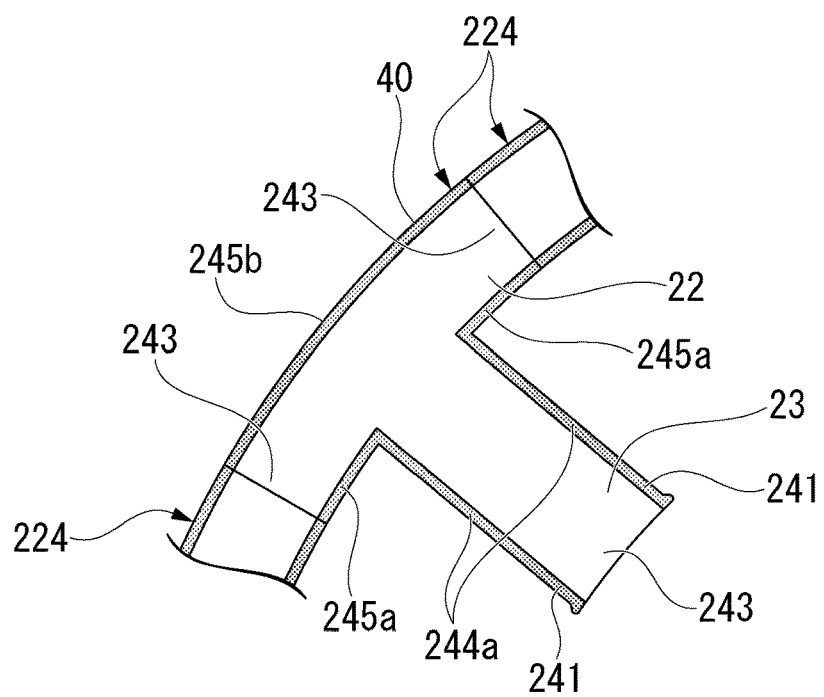
FIG. 5 is a plan view of a core block of Modification Example 2.

Further, for example, as in a core block 224 according to Modification Example 2 shown in FIG. 5, the adhesion part 241 may have a configuration that does not have portions corresponding to the second portion 44b and the fifth portions 45c in the adhesion part 41 of the above-described embodiment. That is, a non-adhesion region 243 of the electrical steel sheet piece 40 in which the adhesion part 241 is not provided may be formed at a tip end of the tooth part 23 and both ends of the stator yoke part 22 in a circumferential direction in the electrical steel sheet piece 40. In this modification example, the adhesion part 241 has a pair of first portions 244a that are disposed at intervals in the circumferential direction in the tooth part 23 and extend in the radial direction, a pair of third portions 245a that extend along an inner edge of the stator yoke part 22 in the radial direction, and a fourth portion 245b that extends along an outer edge of the stator yoke part 22 in the radial direction.

Figure 6:
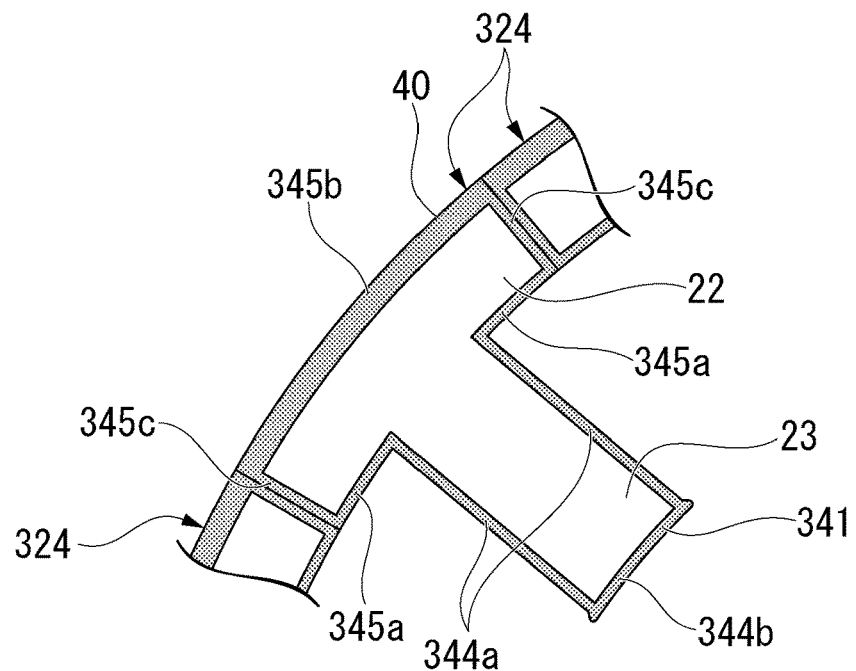
FIG. 6 is a plan view of a core block of Modification Example 3.
Figure 7:
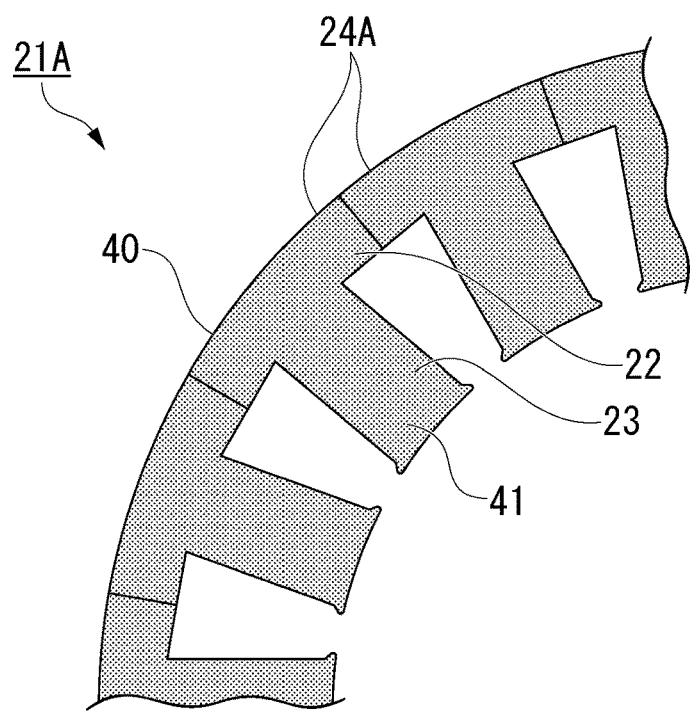
FIG. 7 is a plan view of a stator which is a simulation target of iron loss in a verification test and is a plan view showing a state in which an adhesion area ratio is 100%.
Figure 8:
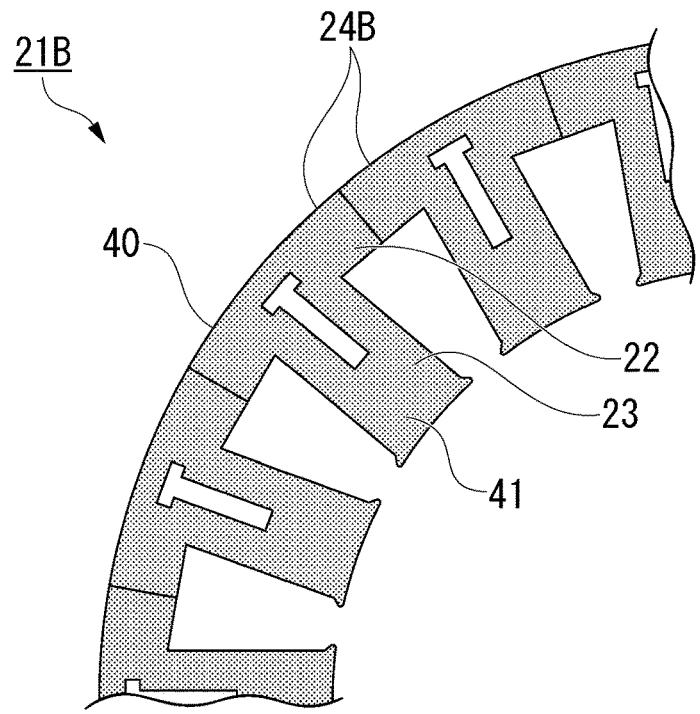
FIG. 8 is a plan view of a stator which is a simulation target of iron loss in a verification test and is a plan view showing a state in which the adhesion area ratio is 90%.
Figure 9:
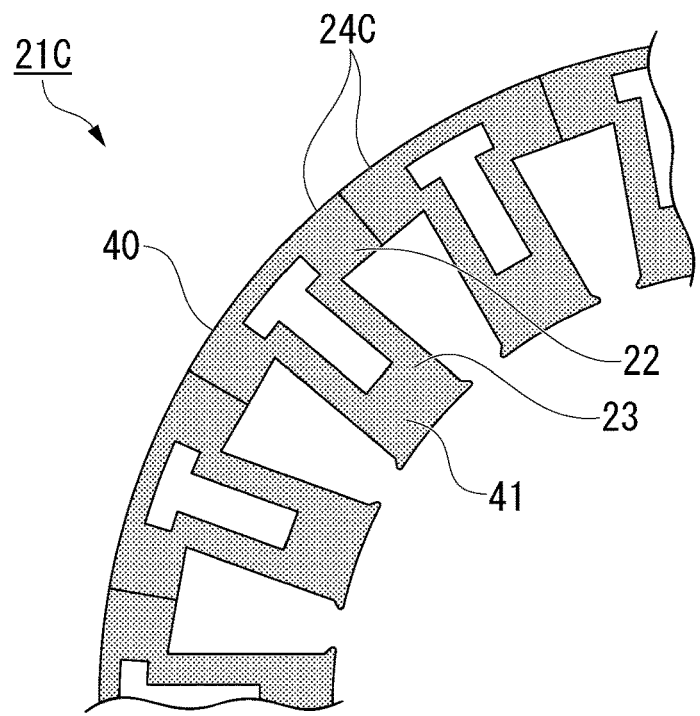
FIG. 9 is a plan view of a stator which is a simulation target of iron loss in a verification test and is a plan view showing a state in which the adhesion area ratio is 85%.
Figure 10:
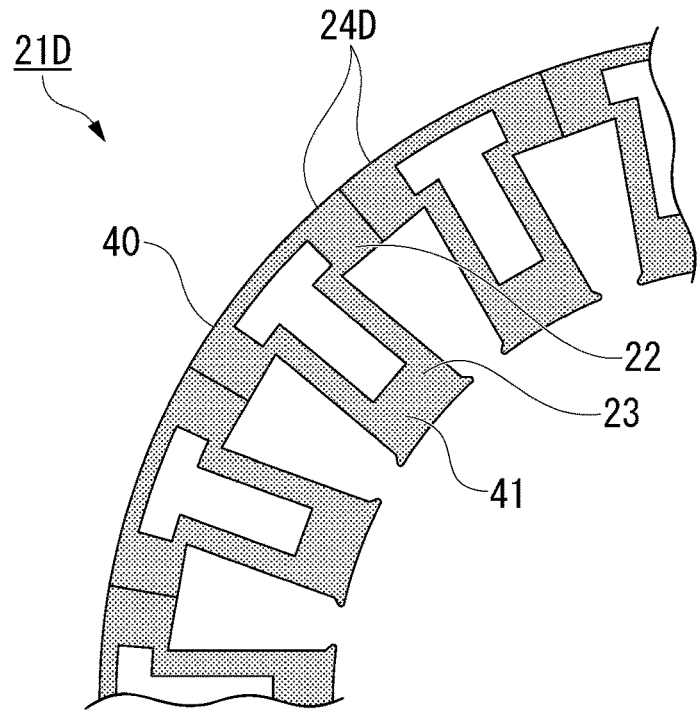
FIG. 10 is a plan view of a stator which is a simulation target of iron loss in a verification test and is a plan view showing a state in which the adhesion area ratio is 70%.
Figure 11:
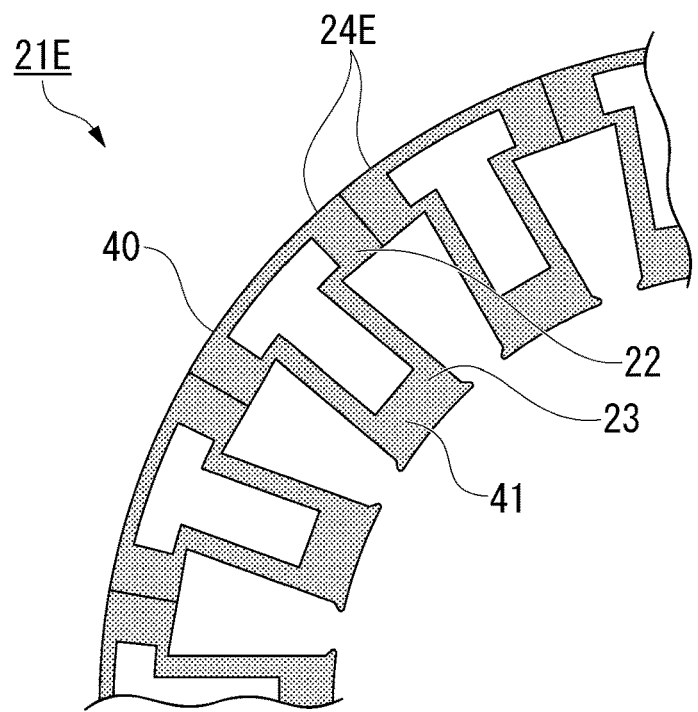
FIG. 11 is a plan view of a stator which is a simulation target of iron loss in a verification test and is a plan view showing a state in which the adhesion area ratio is 60%.
Figure 12:
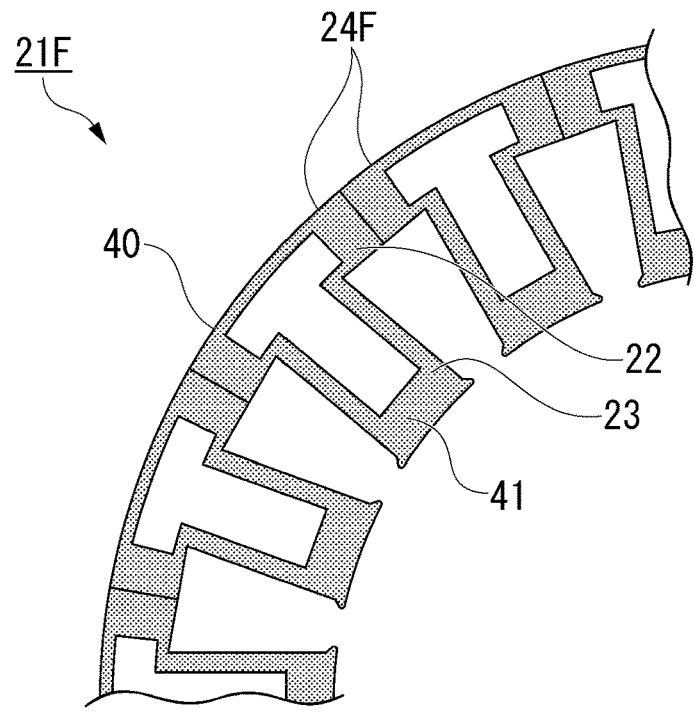
FIG. 12 is a plan view of a stator which is a simulation target of iron loss in a verification test and is a plan view showing a state in which the adhesion area ratio is 50%.
Figure 13:
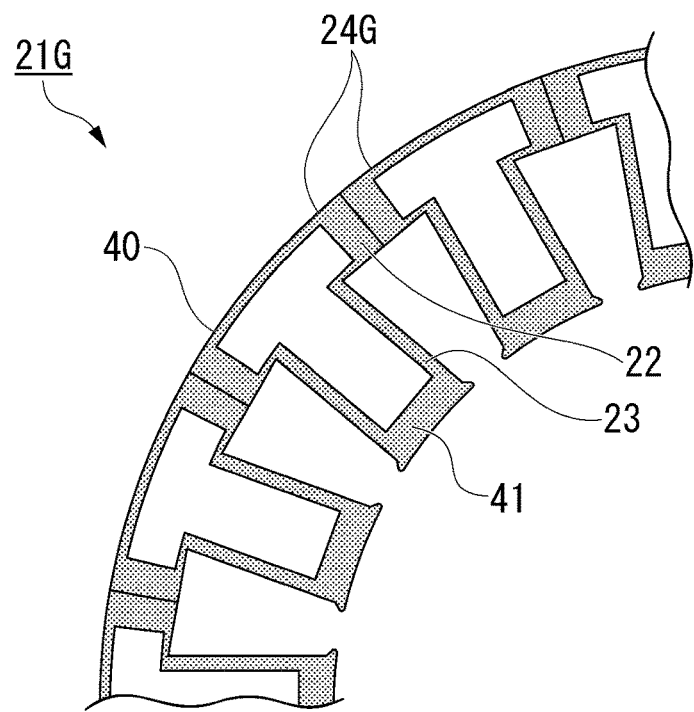
FIG. 13 is a plan view of a stator which is a simulation target of iron loss in a verification test and is a plan view showing a state in which the adhesion area ratio is 40%.
Figure 14:
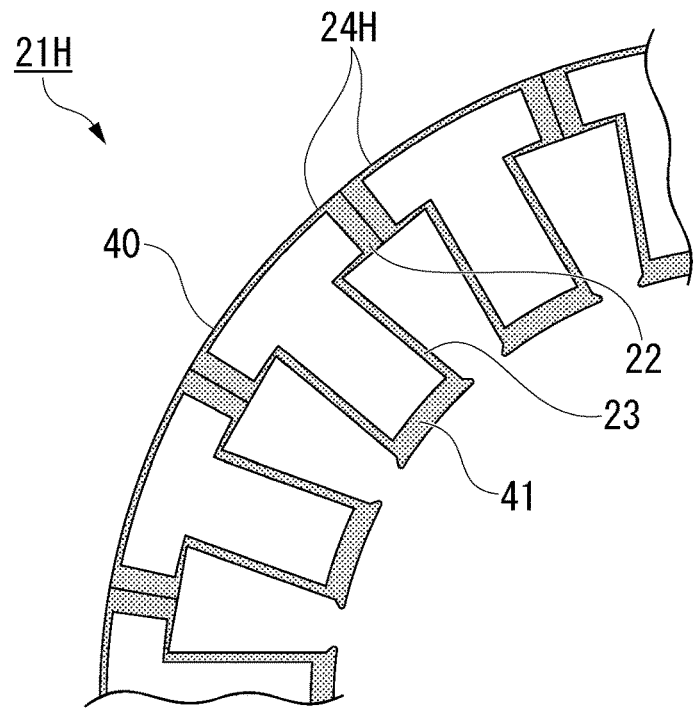
FIG. 14 is a plan view of a stator which is a simulation target of iron loss in a verification test and is a plan view showing a state in which the adhesion area ratio is 30%.
Figure 15:
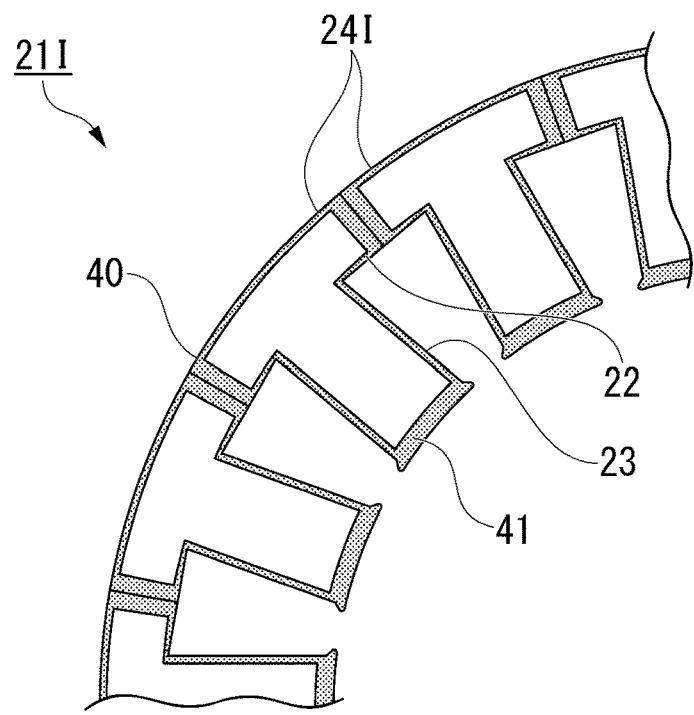
FIG. 15 is a plan view of a stator which is a simulation target of iron loss in a verification test and is a plan view showing a state in which the adhesion area ratio is 20%.
Figure 16:
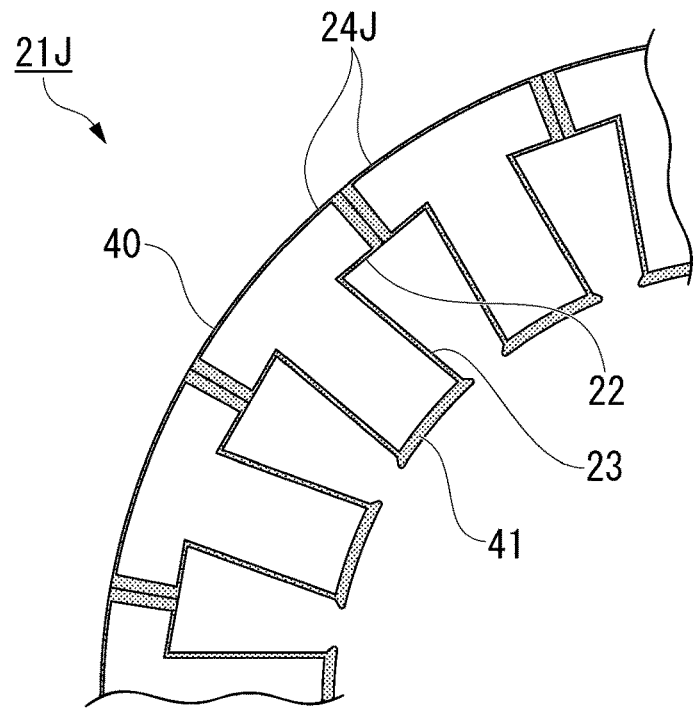
FIG. 16 is a plan view of a stator which is a simulation target of iron loss in a verification test and is a plan view showing a state in which the adhesion area ratio is 15%.
Figure 17:
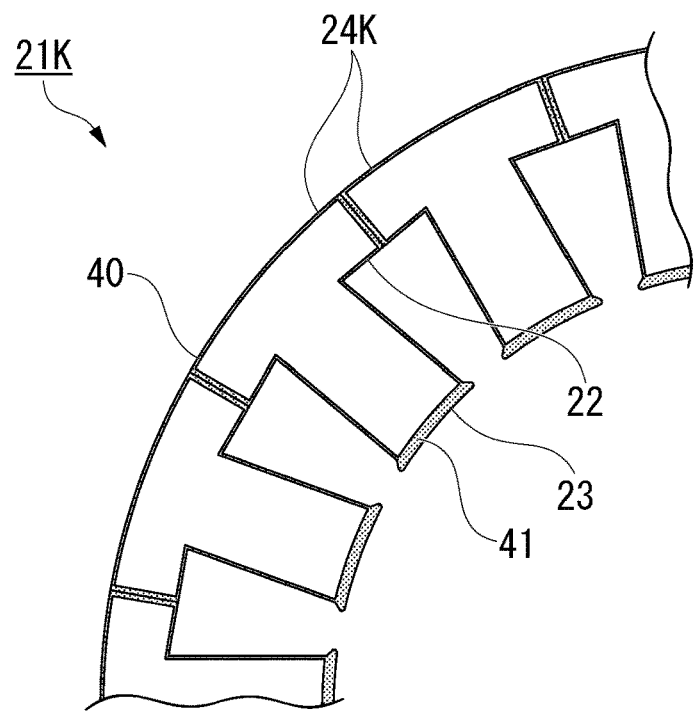
FIG. 17 is a plan view of a stator which is a simulation target of iron loss in a verification test and is a plan view showing a state in which the adhesion area ratio is 10%.
Figure 18:
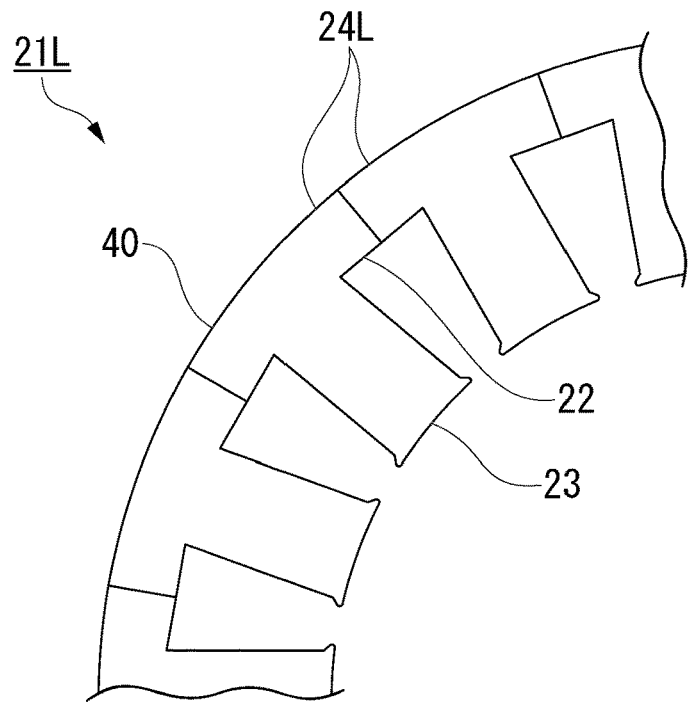
FIG. 18 is a plan view of a stator which is a simulation target of iron loss in a verification test and is a plan view showing a state in which the adhesion area ratio is 0%.

Further, as in a core block 324 according to Modification Example 3 shown in FIG. 6, the width dimension of each portion of an adhesion part 341 may be different from that of the above-described embodiment. The adhesion part 341 of Modification Example 3 has a pair of first portions 344a, a second portion 344b, a pair of third portions 345a, a fourth portion 345b, and a pair of fifth portions 345c as in the above-described embodiment. In this modification example, the widths of the first portions 344a, the second portion 344b, the third portions 345a, and the fifth portions 345c are substantially equal. On the other hand, the width of the fourth portion 345b is wider than the width of each of other portions of the adhesion part 341 (the first portions 344a, the second portion 344b, the third portions 345a, and the fifth portions 345c).

In the present specification, the "width" of each portion of the adhesion part 341 means a dimension in a direction orthogonal to the direction in which the portion extends. For example, the width of each of the second portion 344b, the third portions 345a, and the fourth portion 345b is a dimension in the radial direction of each portion. Further, the width of each of the first portions 344a and the fifth portions 345c is a dimension in the circumferential direction of each portion.

In the present specification, the width of each portion of the adhesion part 41 is 1.5% or more of the outer diameter of the stator core 21. When the width of each portion of the adhesion part 41 is 1.5% or more of the outer diameter of the stator core 21, it is possible to sufficiently secure the adhesion strength between the electrical steel sheet pieces 40.

As shown in FIG. 2, in the present embodiment, all of the adhesion parts 41 provided between the electrical steel sheet pieces 40 have the same plan view shape. The plan view shape of the adhesion part 41 means the overall shape of the adhesion part 41 in a plan view of the electrical steel sheet piece 40, in which the adhesion part 41 is provided, in the stacking direction. The matter that all of the adhesion parts 41 provided between the electrical steel sheet pieces 40 have the same plan view shape includes not only a case in which all of the adhesion parts 41 provided between the electrical steel sheet pieces 40 have completely the same plan view shape, but also a case in which all of the adhesion parts 41 provided between the electrical steel sheet pieces 40 have substantially the same plan view shape in which 95% or more is common.

In the present embodiment, the adhesion area ratio of the electrical steel sheet piece 40 by the adhesion part 41 is 1% or more and 60% or less. In the illustrated example, the adhesion area ratio is 1% or more and 20% or less, and specifically 20%. The adhesion area ratio of the electrical steel sheet piece 40 by the adhesion part 41 is a ratio of an area of a region (an adhesion region 42) of the first surface in which the adhesion part 41 is provided with respect to an area of the first surface of the electrical steel sheet piece 40. The region in which the adhesion part 41 is provided is a region (the adhesion region 42) of the first surface of the electrical steel sheet piece 40 in which the adhesive that has cured without being divided is provided. The area of the region in which the adhesion part 41 is provided can be obtained, for example, by photographing the first surface of the electrical steel sheet piece 40 after peeling and by analyzing an image of the photographed result.

In the present embodiment, between the electrical steel sheet pieces 40, the adhesion area ratio of the electrical steel sheet piece 40 by the adhesion part 41 is 1% or more and 20% or less. In both electrical steel sheet pieces 40 adjacent in the stacking direction, the adhesion area ratio of each of the electrical steel sheet pieces 40 by the adhesion part 41 is 1% or more and 20% or less. In a case in which the adhesion part 41 is provided on each of both sides of one electrical steel sheet piece 40 in the stacking direction, the adhesion area ratio in each of both sides of the electrical steel sheet piece 40 is 1% or more and 20% or less.

Further, in the present embodiment, the adhesion area of the stator yoke part 22 by the adhesion part 41 (hereinafter referred to as "a first adhesion area S1") is preferably equal to or more than the adhesion area of the tooth part 23 by the adhesion part 41 (hereinafter referred to as "a second adhesion area S2"). That is, it is preferable that S1≥S2.

Here, the first adhesion area S1 is an area of a region in the first surface of the electrical steel sheet piece 40 in which the stator yoke portion 45 of the adhesion part 41 is provided. Similarly, the second adhesion area S2 is an area of a region in the first surface of the electrical steel sheet piece 40 in which the tooth portion 44 of the adhesion part 41 is provided. Similar to the area of the region in which the adhesion part 41 is provided, the first adhesion area S1 and the second adhesion area S2 can be obtained, for example, by photographing the first surface of the electrical steel sheet piece 40 after peeling and by analyzing an image of the photographed result.

In the core block 24, if the electrical steel sheet pieces 40 adjacent in the stacking direction are not fixed to each other by some means, they are relatively displaced. On the other hand, in a case in which the electrical steel sheet pieces 40 adjacent in the stacking direction are fixed to each other, for example, by the fastening, plastic strain is applied to a part of the electrical steel sheet piece 40, and the magnetic properties of the core block 24 deteriorate. The fastening is a method of limiting the relative displacement between the stacked electrical steel sheet pieces 40 by plastically deforming a part of the electrical steel sheet pieces 40 and biting them in the stacking thickness direction. Since the magnetic properties of the electrical steel sheet piece 40 deteriorate when plastic strain is applied, the magnetic properties of the entire core block 24 also deteriorate when the fastening is used as a method for fixing the electrical steel sheet pieces 40 to each other.

On the other hand, in the core block 24 according to the present embodiment, the electrical steel sheet pieces 40 adjacent in the stacking direction are adhered to each other by the adhesion part 41. Therefore, it is possible to suppress the relative displacement between the electrical steel sheet pieces 40 adjacent in the stacking direction in all of the plurality of electrical steel sheet pieces 40. Here, the adhesion area ratio of the electrical steel sheet piece 40 by the adhesion part 41 is 1% or more. Therefore, the adhesion by the adhesion part 41 is ensured, and the relative displacement between the electrical steel sheet pieces 40 adjacent in the stacking direction can be effectively regulated even during winding around the tooth part 23 of the core block 24, for example. Moreover, since the method of fixing the electrical steel sheet pieces 40 to each other is not the fixing by the fastening as described above but the fixing by adhesion, the strain generated in the electrical steel sheet piece 40 can be suppressed. From the above, the magnetic properties of the core block 24 can be ensured. In a case in which it is desired to further increase the adhesion strength and suppress the separation of the electrical steel sheet pieces 40 even when an impact is applied, it is more preferable to set the adhesion area ratio to 10% or more.

By the way, when an adhesive is applied to the electrical steel sheet piece 40, compressive stress is generated in the electrical steel sheet piece 40 as the adhesive cures. Therefore, when the adhesion part 41 is formed by applying the adhesive to the electrical steel sheet piece 40, the strain may be generated in the electrical steel sheet piece 40.

However, in the core block 24 according to the present embodiment, the adhesion area ratio of the electrical steel sheet piece 40 by the adhesion part 41 is 60% or less. Therefore, the strain generated in the electrical steel sheet piece 40 due to the adhesive can be suppressed to a low level. Therefore, the magnetic properties of the core block 24 can be further ensured.

Moreover, the adhesion area ratio of the electrical steel sheet piece 40 by the adhesion part 41 is 20% or less. Therefore, the strain generated in the electrical steel sheet piece 40 due to the adhesive can be further suppressed to a low level.

The adhesion part 41 is provided on the adhesion region 42 formed on at least a part of the peripheral edge of the electrical steel sheet piece 40. Therefore, for example, it is possible to suppress the turning over of the electrical steel sheet pieces 40 adjacent in the stacking direction. This facilitates winding around the tooth part 23 of the core block 24, and it is possible to further ensure the magnetic properties of the core block 24. Therefore, the magnetic properties of the core block 24 can be still further ensured.

In a case in which the width W1 (the magnitude in the circumferential direction) of the tooth part 23 is narrower than the width W2 (the magnitude in the radial direction) of the stator yoke part 22, magnetic flux tends to concentrate on the tooth part 23 and the magnetic flux density of the tooth part 23 tends to be high. Therefore, when strain is applied to the steel sheet with the adhesive, if the amount of the strain is the same, the influence on the magnetic properties of the tooth part 23 is greater than that on the magnetic properties of the stator yoke part 22.

In the present embodiment, the first adhesion area S1 is preferably the second adhesion area S2 or more. In this case, it is possible to ensure the adhesion strength of the core block 24 as a whole in the stator yoke part 22 while suppressing the influence of deterioration of the magnetic properties due to the strain of the adhesive in the tooth part 23.

The electrical steel sheet piece 40 for forming the core block 24 is manufactured by a process of punching an electrical steel sheet as a base material. At the time of a process of punching, strain due to the process of punching is applied to a width having the magnitude corresponding to the sheet thickness of the electrical steel sheet piece 40 from the peripheral edge of the electrical steel sheet piece 40 toward the inside of the electrical steel sheet piece 40. Since the peripheral edge of the electrical steel sheet piece 40 is work-hardened by the above strain, the peripheral edge of the electrical steel sheet piece 40 is unlikely to deform so as to locally turn over. Therefore, the electrical steel sheet piece 40 is unlikely to be deformed even if the peripheral edges of the electrical steel sheet pieces 40 are not adhered to each other. Therefore, even when the non-adhesion region 143 is formed on the peripheral edge of the electrical steel sheet piece 40 as in the core block 124 according to the Modification Example 1 shown in FIG. 4, the deformation of the electrical steel sheet piece 40 can be suppressed. By forming the non-adhesion region 143 in this way, it is possible to suppress the application of extra strain to the electrical steel sheet piece 40. Therefore, the magnetic properties of the core block 24 can be further ensured.

Figure 4:
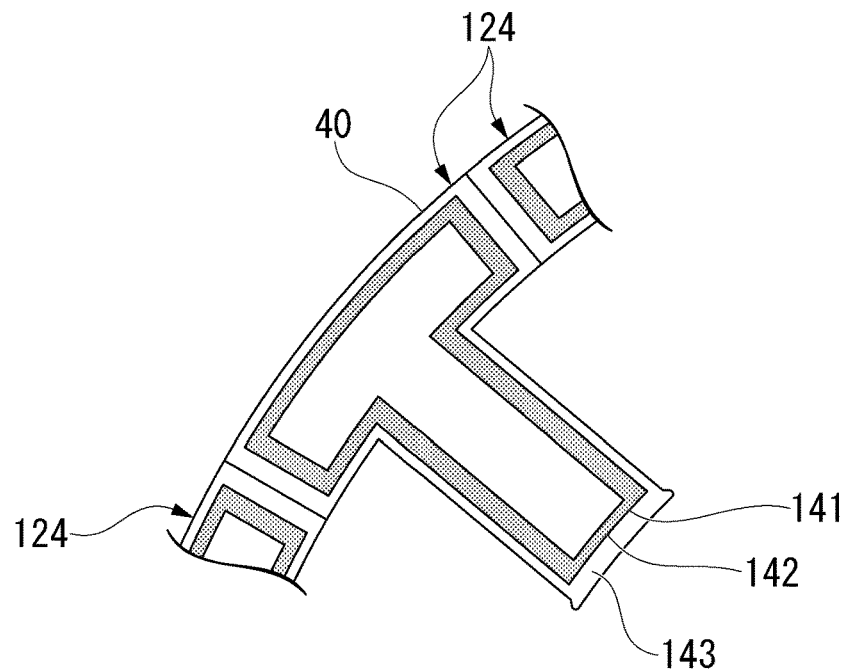
FIG. 4 is a plan view of a core block of Modification Example 1.

Further, as shown in FIG. 4, by providing the non-contact region 143 between the peripheral edge of the electrical steel sheet piece 40 and the adhesion part 141, it is possible to suppress the squeeze out of an uncured adhesive from the peripheral edge of the electrical steel sheet piece 40 when the electrical steel sheet pieces 40 are stacked. If the adhesive is cured in a state of the squeeze out from the tip end of the tooth part 23, it may interfere with the rotating rotor 30. Further, if the adhesive is cured in a state of the squeeze out from the side portion of the tooth part 23, the cross-sectional area of slots between the tooth parts 23 may be compressed and the space factor of a coil may decrease.

The width of the non-adhesion region 143 is preferably 1 times or more and 10 times or less the sheet thickness of the electrical steel sheet piece 40. By increasing the width of the non-adhesion region 143 to 1 times or more, it is possible to effectively suppress the squeeze out of the adhesive. Further, by setting the width of the non-adhesion region 143 to 10 times or less, it can be expected that the effect of suppressing the turning over of the electrical steel sheet piece 40 due to work hardening from the peripheral edge of the electrical steel sheet piece 40 can be obtained.

In the present specification, the "width" of the non-adhesion region 143 means a dimension in a direction orthogonal to the direction in which each portion of the non-adhesion region 143 extends. The width of the non-adhesion region 143 is preferably a dimension within the above range over the entire length of the non-adhesion region 143.

In the core block 24, the magnetic flux diffuses and extends from the tip end of the tooth part 23 to both sides in the circumferential direction. Therefore, the magnetic flux tends to concentrate on the tip end of the tooth part 23. Further, the magnetic flux penetrates into the adjacent core blocks 24 from both ends of the stator yoke part 22 in the circumferential direction. Therefore, the magnetic flux tends to concentrate on the both ends of the stator yoke part 22 in the circumferential direction. When the adhesion region 42 is provided in the region on which the magnetic flux concentrates, the increase in iron loss tends to be remarkable. Therefore, as shown in the Modification Example 2 of FIG. 5, the non-adhesion region 243 is provided at the tip end of the tooth part 23 and the both ends of the stator yoke part 22 in the circumferential direction, and thus the adhesion region 242 can be disposed to be separated from the region having a high magnetic flux density and an increase in iron loss can be suppressed.

The magnetic flux B tends to flow at the shortest distance with low magnetoresistance. Therefore, in the stator yoke part 22, the magnetic flux density decreases from the inside in the radial direction (one side in the radial direction) which is connected to the tooth part 23 toward the outside in the radial direction (another side in the radial direction) which is away from the tooth part 23. On the other hand, as described above, the magnetic flux tends to concentrate on the tip end of the tooth part 23 and the both ends of the stator yoke part 22 in the circumferential direction. In Modification Example 3 of FIG. 6, the width of each of the second portion 344*b* and the fifth portions 345*c* located at the tip end of the tooth part 23 and the both ends of the stator yoke part 22 in the circumferential direction is narrower than the width of the fourth portion 345*b* that extends along the peripheral edge on the outside of the stator yoke part 22 in the radial direction. That is, according to Modification Example 3, the width of each of the second portion 344*b* and the fifth portions 345*c*, in which the magnetic flux density tends to increase, can be narrowed to suppress an increase in iron loss. Further, according to Modification Example 3, by increasing the width of the fourth portion 345*b* in which the magnetic flux density is unlikely to increase, it is possible to increase the adhesion strength between the electrical steel sheet pieces 40 and to reduce the influence of the adhesion part 341 on the iron loss.

The technical scope of the present invention is not limited to the above-described embodiments, and various modifications can be made without departing from the gist of the present invention.

The shape of the core block 24 is not limited to the forms shown in the above-described embodiments. The dimension of each part of the core block 24, the sheet thickness of the electrical steel sheet piece 40, and the like can be arbitrarily designed according to the desired characteristics of the electric motor.

Further, in the core block, a projection shape may be provided in an end surface on one side of the stator yoke part in the circumferential direction, and a recess shape may be provided in an end surface on another side of the stator yoke part in the circumferential direction. In this case, by inserting the projection shape into the recess shape, it is possible to suppress the positional deviation when the plurality of core blocks are connected to each other in the circumferential direction.

Further, the core block may have two or more tooth parts for one stator yoke part. Furthermore, the stator yoke part and the tooth part may be separate core blocks.

In the rotor of the above-described embodiments, a set of two permanent magnets 32 form one magnetic pole, but the present invention is not limited to this. For example, one permanent magnet 32 may form one magnetic pole, or three or more permanent magnets 32 may form one magnetic pole.

In the above-described embodiments, the permanent magnetic electric motor has been described as an example of the electric motor, but the structure of the electric motor is not limited to this as will be illustrated below, and as the structure of the electric motor, various known structures that will not be illustrated below can also be adopted.

In the above-described embodiments, the permanent magnetic electric motor has been described as an example of the synchronous motor, however, the present invention is not limited to this. For example, the electric motor may be a reluctance motor or an electromagnet field motor (a wound-field motor).

In the above-described embodiments, the synchronous motor has been described as an example of the AC motor, however, the present invention is not limited to this. For example, the electric motor may be an induction motor.

In the above-described embodiments, the AC motor has been described as an example of the motor, however, the present invention is not limited to this. For example, the electric motor may be a DC motor.

In the above-described embodiments, the motor has been described as an example of the electric motor, however, the present invention is not limited to this. For example, the electric motor may be an electric generator.

In the above-described embodiments, the case in which the laminated core according to the present invention is applied to the stator core has been illustrated, however, the laminated core according to the present invention can also be applied to the rotor core. Further, the laminated core according to the present invention may be applied to a laminated core of a transformer and the like other than the electric motor.

In addition, it is possible to appropriately replace the configuration elements in the above-described embodiments with well-known configuration elements without departing from the gist of the present invention, and the above-described modification examples may be appropriately combined.

For example, the core block may be a combination of the configuration of Modification Example 1 and the configuration of Modification Example 2. That is, as in Modification Example 1 shown in FIG. 4, the non-contact region 143 may be provided between the peripheral edge of the electrical steel sheet piece 40 and the adhesion part 141, and further, as in Modification Example 2 shown in FIG. 5, the non-adhesion region 243 may be provided at the tip end of the tooth part 23 and the both ends of the stator yoke part 22 in the circumferential direction.

Similarly, the core block may be a combination of the configuration of Modification Example 1 and the configuration of Modification Example 3. That is, as in Modification Example 1 shown in FIG. 4, the non-contact region 143 may be provided between the peripheral edge of the electrical steel sheet piece 40 and the adhesion part 141, and as in Modification Example 3 shown in FIG. 6, the width of each of the second portions 344b and the fifth portions 345c of the adhesion part 341 may be configured to be narrower than the width of the fourth portion 345b.

Examples

Next, verification tests (first to third verification tests) were executed to verify the above-mentioned operational effects. The present verification test was executed by a simulation using software. As the software, electromagnetic field simulation software JMAG which is based on a finite element method and is manufactured by JSOL Corporation was used.

(First Verification Test)

FIGS. 7 to 18 show 12 types of stator cores 21A to 21L for each of which the simulation was executed in the present verification test. In each of these stator cores 21A to 21L, the stator core 21 according to the embodiment shown in FIG. 3 was used as a basic structure, and the following points were changed with respect to the stator core 21. The stator cores 21A to 21L have a plurality of core blocks 24A to 24L, respectively. Further, the sheet thickness of the electrical steel sheet piece 40 was set to 0.25 mm. Furthermore, the adhesion area ratio of each electrical steel sheet piece 40 by the adhesion part 41 was made different from each other from 0% to 100%. More specifically, the adhesion area ratio of the stator core 21A is 100%. The adhesion area ratio of the stator core 21B is 90%. The adhesion area ratio of the stator core 21C is 85%. The adhesion area ratio of the stator core 21D is 70%. The adhesion area ratio of the stator core 21E is 60%. The adhesion area ratio of the stator core 21F is 50%. The adhesion area ratio of the stator core 21G is 40%. The adhesion area ratio of the stator core 21H is 30%. The adhesion area ratio of the stator core 21I is 20%. The adhesion area ratio of the stator core 21J is 15%. The adhesion area ratio of the stator core 21K is 10%. The adhesion area ratio of the stator core 21L is 0%.

Figure 19:
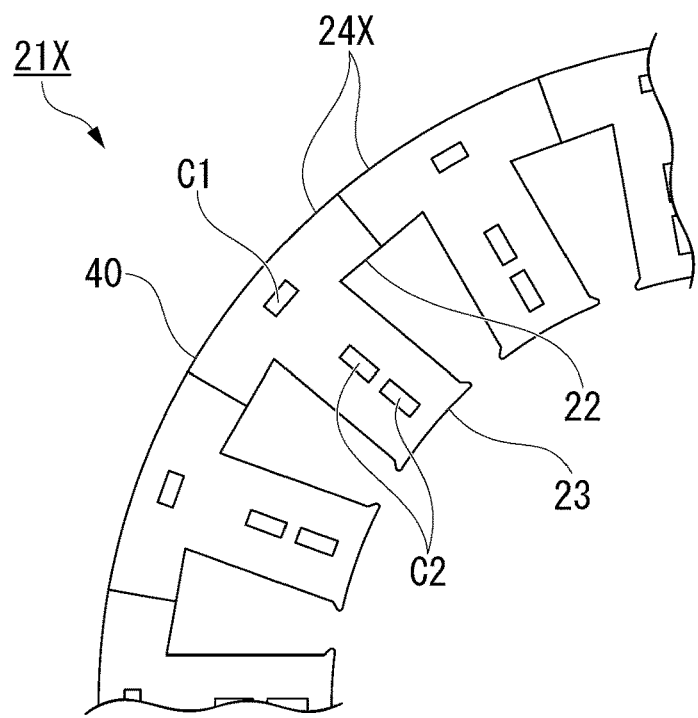
FIG. 19 is a plan view of a comparative stator core which is a simulation target of iron loss in a verification test and is a plan view showing a state in which electrical steel sheets are connected to each other by fastening.

The iron loss of each of 12 types of stator cores 21A to 21L was obtained by the above simulation. In addition, as a comparison target, as shown in FIG. 19, the iron loss of a comparative stator core 21X in which the plurality of electrical steel sheet pieces 40 were fastened to each other in all layers was also obtained. The comparative stator core 21X has a plurality of core blocks 24X. The sheet thickness of the electrical steel sheet piece 40 of the comparative stator core 21X is also 0.25 mm. The core block of the comparative stator core 21X is provided with a first fastening part C1 provided in the stator yoke part 22 and two second fastening parts C2 provided in the tooth part 23. The first fastening part C1 is located in a center of the stator yoke part 22 in the circumferential direction. The two second fastening parts C2 are arranged in the radial direction in a center of the tooth part 23 in the circumferential direction. The ratio of the area occupied by the fastening parts C1 and C2 to the first surface of the electrical steel sheet piece 40 is about 3.2%.

Figure 20:
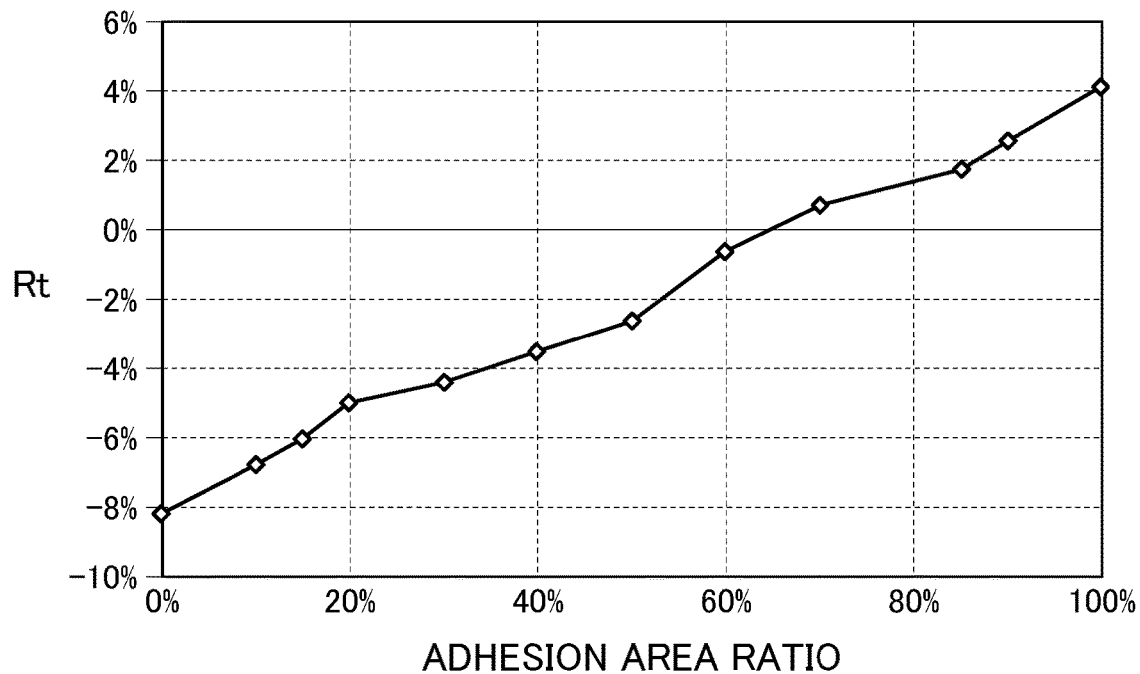
FIG. 20 is a graph showing the results of the verification tests.

The results are shown in the graph of FIG. 20. In the graph of FIG. 20, the horizontal axis is the adhesion area ratio of the electrical steel sheet piece 40 of each of the stator cores 21A to 21L. The vertical axis is an iron loss suppression ratio Rt which is a value obtained by dividing the difference between the iron loss of each of the stator cores 21A to 21L and the iron loss of the comparative stator core 21X by the iron loss of the comparative stator core 21X, the value being represented as a percentage. That is, the iron loss suppression ratio Rt on the vertical axis of the graph of FIG. 20 is expressed by the following equation (1) when the iron loss of each of the stator cores 21A to 21L is W and the iron loss of the comparative stator core 21X is $W_{org}$.

[Math. 1]

$$Rt = \frac{W - W_{org}}{W_{org}} \times 100 [\%] \quad (1)$$

When the iron loss of the electrical steel sheet piece 40 in each of the stator cores 21A to 21L is equivalent to the iron loss in the comparative stator core 21X, the value on the vertical axis becomes 0%. The graph indicates that the smaller the iron loss suppression ratio, the smaller the iron loss, and the better the magnetic properties of the stator core.

From the graph shown in FIG. 20, it was confirmed that the iron loss of the core block of the embodiment was made smaller than that of the comparative stator core 21X of the related art by setting the adhesion area ratio of the electrical steel sheet piece 40 by the adhesion part 41 to 60% or less. Further, it was confirmed that the iron loss of the core block of the embodiment could be reduced by 3% or more as compared with that of the comparative stator core 21X of the related art by setting the adhesion area ratio of the electrical steel sheet piece 40 by the adhesion part 41 to 40% or less. Furthermore, it was confirmed that the iron loss of the core block of the embodiment could be reduced by 5% or more as compared with that of the comparative stator core 21X of the related art by setting the adhesion area ratio of the electrical steel sheet piece 40 by the adhesion part 41 to 20% or less.

(Second Verification Test)

Next, the adhesion strength of the electrical steel sheet piece when the adhesion area ratio was changed was verified.

First, a core block in which electrical steel sheet pieces each having an adhesion area ratio of 0% (that is, no adhesion) were stacked, a core block in which electrical steel sheet pieces each having an adhesion area ratio of 0.5% were stacked, a core block in which electrical steel sheet pieces each having an adhesion area ratio of 1% were stacked, and a core block in which electrical steel sheet pieces each having an adhesion area ratio of 10% were stacked were prepared. Next, winding was performed around the tooth part of each of these core blocks, and it was confirmed whether the winding could be done smoothly. The verification results are shown in Table 1.

TABLE 1

| Adhesion area ratio | Winding feasibility |
|---|---|
| 0% | × |
| 0.5% | × |
| 1% | ○ |
| 10% | ○ |

In Table 1, "x" means that the core block collapsed due to a force applied to the core block during winding. Further, "○" means that winding was completed. By this verification, it was confirmed that the adhesion strength required for winding could be ensured by setting the adhesion area ratio of the electrical steel sheet piece to 1% or more. When the adhesion strength of each of the samples with the adhesion area ratios of 1% and 10% was confirmed, it was confirmed that the sample with the adhesion area ratio of 10% had higher strength. From the viewpoint of obtaining sufficient adhesion strength to suppress peeling of the adhesion part at the time of dropping, the adhesion area ratio is preferably 10% or more.

(Third Verification Test)

The present verification test is a verification test regarding the width of each portion of the adhesion part. The simulation conditions and dimensional conditions are the same as in the first verification test.

Figure 21:
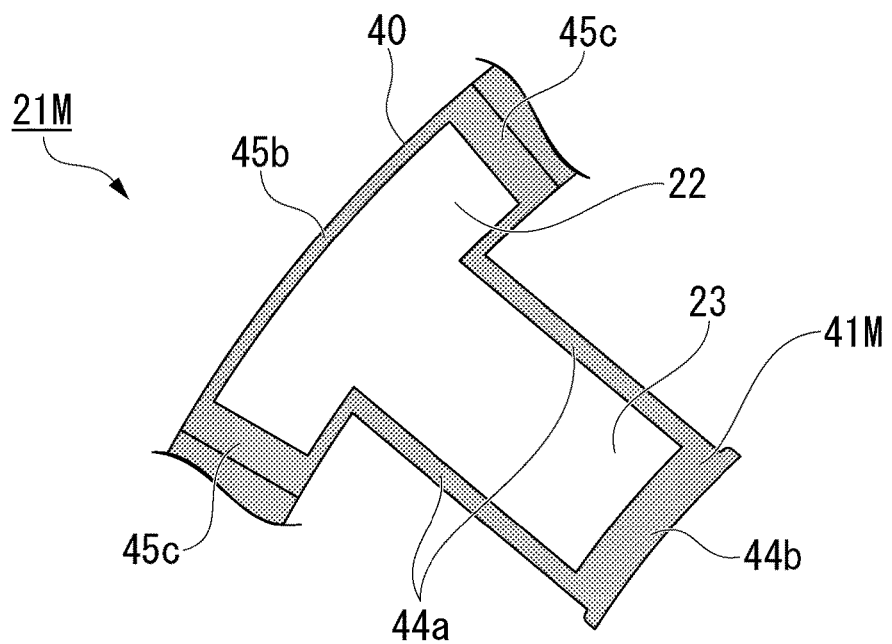
FIG. 21 is a plan view of a stator which is a simulation target of iron loss in a verification test.
Figure 22:
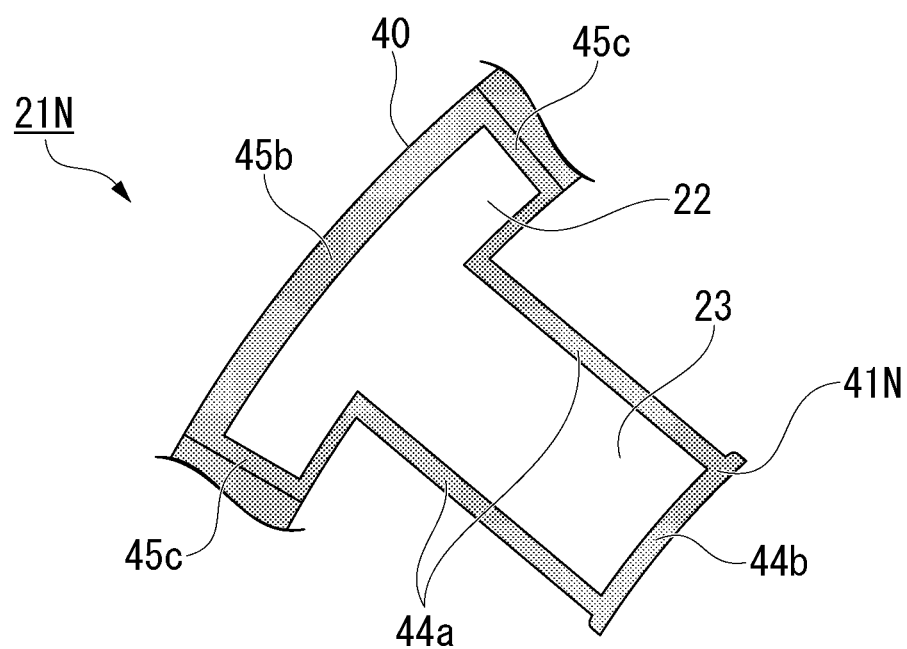
FIG. 22 is a plan view of a stator which is a simulation target of iron loss in a verification test.

FIGS. 21 and 22 show two types of stator cores 21M to 21N for each of which the simulation was executed in the present verification test. In these stator cores 21M and 21N, the stator core 21 according to the embodiment shown in FIG. 3 is used as a basic structure.

In an adhesion part 41M of the stator core 21M shown in FIG. 21, the width of each of the second portion 44b and the fifth portion 45c is wider than the width of each of the other portions. On the other hand, in an adhesion part 41N of the stator core 21N shown in FIG. 22, the width of the fourth portion 45b is wider than the width of each of the other portions. Further, the areas of the adhesion parts 41N of the stator cores 21M and 21N are equal to each other. Therefore, the adhesion strength of the stator cores 21M and the adhesion strength of the stator cores 21N are equal to each other.

When the iron loss of each of the stator cores 21M and 21N was calculated by simulation, the iron loss of the stator core 21N was 98% of the iron loss of the stator core 21M. That is, the iron loss of the stator core 21N was reduced by 2% with respect to the stator core 21M. It is considered that this is because, in the stator core 21N, the width of each of the second portion 44b and the fifth portion 45c is narrower than the width of the fourth portion 45b, and thus the magnetic flux easily flows in the stator core 21N.

BRIEF DESCRIPTION OF THE REFERENCE SYMBOLS

10 Electric motor
21 Stator core (laminated core)
22 Stator yoke part
23 Tooth part
24, 124, 224, 324 Core block
40 Electrical steel sheet piece
41, 141, 241, 341 Adhesion part
42, 142, 242 Adhesion region
143, 243 Non-adhesion region
44a, 244a, 344a First portion
44b, 344b Second portion
45a, 245a, 345a Third portion
45b, 245b, 345b Fourth portion
45c, 345c Fifth portion

The invention claimed is:

1. A core block, a plurality thereof constituting a laminated core by being connected in an annular shape, the core block comprising:
a plurality of electrical steel sheet pieces stacked to each other; and
an adhesion part which is provided between the electrical steel sheet pieces adjacent in a stacking direction and adheres the electrical steel sheet pieces to each other,
wherein the electrical steel sheet pieces comprises an arc-shaped stator yoke part and a tooth part that protrudes from the stator yoke part to one side in a radial direction of the stator yoke part,
wherein the adhesion part includes
a pair of first portions that extend along peripheral edges on both sides of the tooth part in a circumferential direction;
a pair of third portions that extend from base ends of the first portions to both sides in the circumferential direction along a peripheral edge on the one side in the radial direction of the stator yoke part; and
a fourth portion that extends in the circumferential direction along a peripheral edge on another side of the stator yoke part in the radial direction, and
wherein an adhesion area ratio of each of the electrical steel sheet pieces by the adhesion part is 1% or more and 60% or less.

2. The core block according to claim 1, wherein the adhesion area ratio is 1% or more and 20% or less.

3. The core block according to claim 1,
wherein the adhesion part further includes
a second portion that extends along a peripheral edge of a tip end of the tooth part and connects tip ends of the pair of first portions to each other, and
a pair of fifth portions that extend along peripheral edges on both sides of the stator yoke part in the circumferential direction and connect the third portions and the fourth portion to each other.

4. The core block according to claim 3, wherein a width of each of the second portion and the fifth portion is narrower than a width of the fourth portion.

5. The core block according to claim 1, wherein the adhesion part is provided on at least a part of a peripheral edge of each of the electrical steel sheet pieces.

6. The core block according to claim 1, wherein a non-adhesion region of each of the electrical steel sheet pieces in which the adhesion part is not provided is formed between an adhesion region of each of the electrical steel sheet pieces in which the adhesion part is provided and a peripheral edge of each of the electrical steel sheet pieces.

7. The core block according to claim 6, wherein a width of the non-adhesion region is 1 times or more and 10 times or less a sheet thickness of each of the electrical steel sheet pieces.

8. The core block according to claim 1, comprising:
an arc-shaped stator yoke part; and
a tooth part that protrudes from the stator yoke part in a radial direction of the stator yoke part,
wherein a non-adhesion region of each of the electrical steel sheet pieces in which the adhesion part is not provided is formed at a tip end of the tooth part and both ends of the stator yoke part in a circumferential direction in each of the electrical steel sheet pieces.

9. The core block according to claim 1, comprising:
an arc-shaped stator yoke part; and
a tooth part that protrudes from the stator yoke part in a radial direction of the stator yoke part,
wherein an adhesion area of the stator yoke part by the adhesion part is equal to or larger than an adhesion area of the tooth part by the adhesion part.

10. The core block according to claim 1, wherein an average thickness of the adhesion part is 1.0 µm to 3.0 µm.

11. The core block according to claim 1, wherein an average tensile modulus of elasticity E of the adhesion part is 1500 MPa to 4500 MPa.

12. The core block according to claim 1, wherein the adhesion part is a room temperature adhesion type acrylic-based adhesive including SGA made of an elastomer-containing acrylic-based adhesive.

13. A laminated core constituted by a plurality of core blocks, each of which is the core block according to claim 1, connected to each other in an annular shape.

14. An electric motor comprising the laminated core according to claim 13.

15. The core block according to claim 1, wherein the adhesion region is disposed to be separated from a region having a high magnetic flux density.

16. The core block according to claim 1, wherein, when a peripheral edge of each of the electrical steel sheet pieces is work-hardened, the adhesion part is provided to include at least a part other than a work-hardened part.

17. The core block according to claim 6, wherein the non-adhesion region is formed between the fourth portion and the peripheral edge of each of the electrical steel sheet pieces.

18. The core block according to claim 9, wherein a width of the fourth portion is wider than a width of the first portion and a width of the third portion.

* * * * *